United States Patent
Zhang et al.

(10) Patent No.: US 8,760,083 B2
(45) Date of Patent: Jun. 24, 2014

(54) BALLAST WITH CONTROL DEVICE FOR CONTROLLING THE OPEN-CIRCUIT VOLTAGE

(75) Inventors: Qi Zhang, Shanghai (CN); Weiqiang Zhang, Shanghai (CN); Jianping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 258 days.

(21) Appl. No.: 13/239,072

(22) Filed: Sep. 21, 2011

(65) Prior Publication Data
US 2012/0313539 A1 Dec. 13, 2012

(30) Foreign Application Priority Data
Jun. 7, 2011 (CN) .......................... 2011 1 0151773

(51) Int. Cl.
*H05B 37/02* (2006.01)
(52) U.S. Cl.
USPC .......................... 315/307; 315/247; 315/294
(58) Field of Classification Search
USPC .......... 315/200 R, 209 R, 224–226, 246–247, 315/274–279, 291, 294, 297, 307, 308, 312
See application file for complete search history.

(56) References Cited

U.S. PATENT DOCUMENTS

| | | | | |
|---|---|---|---|---|
| 6,023,132 A * | 2/2000 | Crouse et al. | ................. | 315/307 |
| 2007/0164688 A1* | 7/2007 | Fukuda et al. | ................. | 315/291 |
| 2009/0273296 A1* | 11/2009 | Veskovic et al. | ............... | 315/246 |
| 2011/0304279 A1* | 12/2011 | Felty | ............................ | 315/307 |
| 2012/0146526 A1* | 6/2012 | Lam et al. | ................. | 315/200 R |

* cited by examiner

*Primary Examiner* — Tung X Le
(74) *Attorney, Agent, or Firm* — Kirton McConkie; Evan R. Witt

(57) ABSTRACT

A ballast which controls the open-circuit voltage of the ballast. The ballast includes a power factor corrector (PFC) for receiving an AC input voltage and converting the AC input voltage into a power factor corrected DC voltage; a DC/DC converter connected to the PFC and having a switch placed at a low-voltage side of the DC/DC converter for converting the DC voltage of the PFC into a DC output voltage according to the switching operation of the switch; a controller connected to a control terminal of the switch of the DC/DC converter for sending a switching control signal to control the switch; and an open-circuit voltage controller for detecting a voltage associated with the open-circuit voltage of the ballast and regulating the duty ratio or pulse density or switching frequency of the switching control signal in response to the results of the detection, thereby controlling the open-circuit voltage.

16 Claims, 8 Drawing Sheets

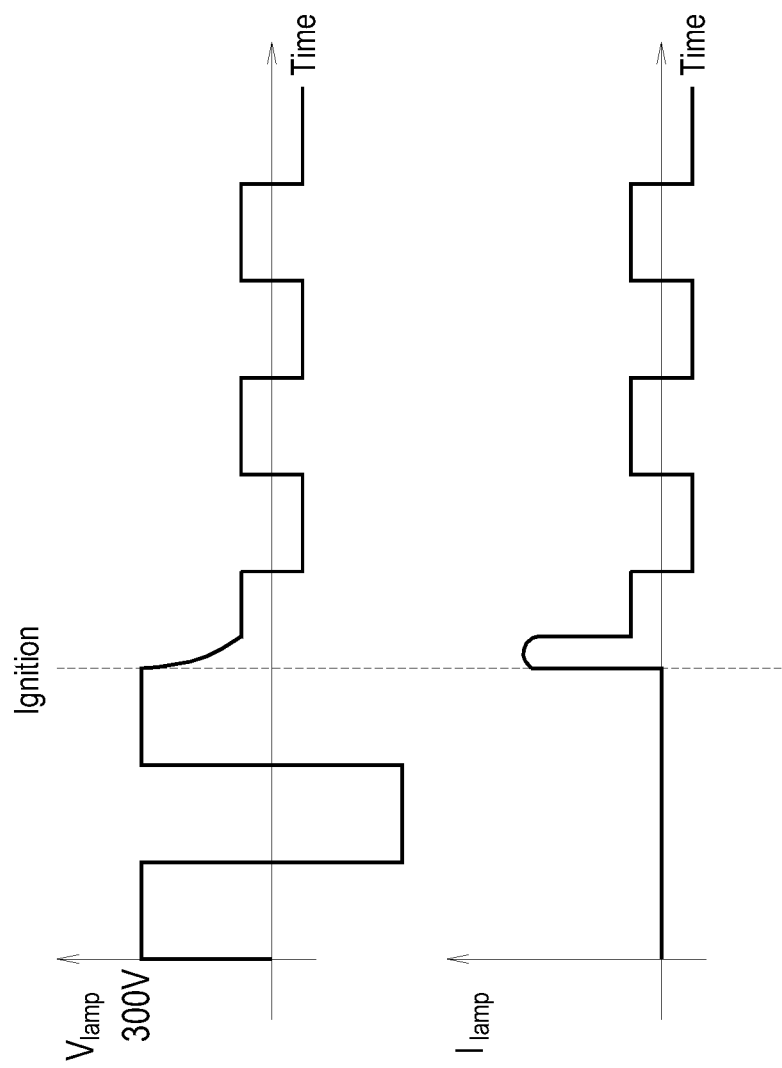

BALLAST WITH CONTROL DEVICE FOR CONTROLLING THE OPEN-CIRCUIT VOLTAGE

FIELD OF THE INVENTION

The invention relates to a ballast for gas discharge lamp, and more particularly to a ballast for gas discharge lamps with a control device for controlling the open-circuit voltage of the ballast.

BACKGROUND OF THE INVENTION

Generally, open-circuit voltage is the voltage difference of electrical potentials between two terminals of a device when there is no external load connected. In the applications of gas discharge lamps, ballasts are used to limit the current flowing through the gas discharge lamps. Therefore, electrical ballasts have to provide sufficient open-circuit voltage to allow the gas discharge lamps to have enough energy to maintain the glow discharge state and transits from the glow discharge state to the arc discharge state.

FIG. 1 shows a block diagram of a ballast for gas discharge lamps according to the prior art. As shown in FIG. 1, a ballast includes a PFC (power factor corrector) 102, a DC/DC converter 104, an input filtering capacitor C1, and an inverter 106. The ballast is used to receive an AC input voltage Vin and provide the energy required to ignite the gas discharge lamp Lp1. The gas discharge lamp Lp1 is a high intensity discharge lamp (HID) lamp. The PFC 102 is used to rectify the AC input voltage Vin into a DC voltage with a corrected power factor for suppressing the harmonic noises in the input current. The input filtering capacitor C1 is connected to the output end of the PFC 102 for removing the noises and interferences of the DC voltage outputted from the PFC 102. The DC/DC converter 104 is connected to the input filtering capacitor C1 and is made up of a buck converter, which converts the DC voltage outputted from the PFC 102 into a lower DC voltage. The inverter 106 is connected to the output end of the DC/DC converter 104 for converting the output DC voltage of the DC/DC converter 104 into an AC voltage, thereby driving the gas discharge lamp Lp1. It is noteworthy that if the gas discharge lamp Lp1 is a DC lamp, the inverter 106 may be eliminated. The DC/DC converter 104 is used to control the operating state of the gas discharge lamp Lp1, thereby allowing the gas discharge lamp Lp1 to operate under the steady state with constant current mode or constant power mode.

FIG. 2 shows a block diagram of a ballast for gas discharge lamps according to the prior art, in which the detailed circuitry of the DC/DC converter 104 of FIG. 1. It should be noted that similar circuit elements are labeled with the same reference numeral. In FIG. 2, the DC/DC converter 104 is a buck converter and includes a switch Q1, a rectifying diode D1, an inductor L1, and a capacitor C2. The rectifying diode D1 is connected in parallel with the input filtering capacitor C1, and the capacitor C2 is connected in parallel with the rectifying diode D1. The inductor L1 is connected between the anode of the rectifying diode D1 and one end of the capacitor C2. The switch Q1 is driven by a driver (not shown) to conduct switching operations. The switch Q1 has a first terminal (or positive terminal), a second terminal (or negative terminal), and a third terminal (or control terminal). There are two possible ways to locate the switch Q1. The first way of locating the switch Q1 is to place the switch Q1 between the capacitor C1 and the cathode of the rectifying diode D1, i.e. the switch Q1 can be located at the high-voltage side of the DC/DC converter. However, such configuration requires an additional isolation device such as a photo coupler to drive the switch Q1. Hence, such configuration will increase the cost and make the switch Q1 to be driven in a difficult manner. The second way of locating the switch Q1 is to place the switch Q1 between the capacitor C1 and the anode of the rectifying diode D1, i.e. the switch Q1 can be located at the low-voltage side of the DC/DC converter, as shown in FIG. 2. Such configuration allows the second terminal of the switch Q1 to share the same ground point with the input filtering capacitor C1, thereby eliminating the isolation device and rendering the switch Q1 easy to be driven. Hence, the configuration of locating the switch Q1 is to place the switch Q1 between the capacitor C1 and the anode of the rectifying diode D1 is widely used. The operation of the DC/DC converter 104 is described as follows. The energy of the voltage on the input filtering capacitor C1 is transferred to the inductor L1 and the capacitor C2 by the switch operation of the switch Q1. The rectifying diode D1 provides a current path for the inductor L1 when the switch Q1 is turned off. The inductor L1 and the capacitor C2 form an output filter for removing the noises of the output voltage derived from the switching operation of the switch Q1. The output voltage of the DC/DC converter 104 is established on the capacitor C2.

Referring to FIGS. 1 and 8, in which FIG. 8 shows the waveform diagram of the lamp voltage and the lamp current of the ballast for gas discharge lamps. Before the gas discharge lamp Lp1 is ignited, the ballast of the gas discharge lamp Lp1 needs to provide an appropriate open-circuit voltage having a voltage level of 300V, for example, to supply sufficient energy for the gas discharge lamp Lp1 to transit from the glow discharge state to the arc discharge state. Hence, before the gas discharge lamp Lp1 is ignited, the lamp voltage Vlamp is the open-circuit voltage of the ballast. Also, before the gas discharge lamp Lp1 is ignited, the lamp current Ilamp flowing through the gas discharge lamp Lp1 is zero. After the gas discharge lamp Lp1 is ignited, the lamp current Ilamp is ascending and the impedance of the gas discharge lamp Lp1 is descending rapidly, thereby lowering the lamp voltage Vlamp of the gas discharge lamp Lp1. When the gas discharge lamp Lp1 enters the steady state, the impedance of the gas discharge lamp Lp1 is maintained at a stable value (the stable value is the impedance of the gas discharge lamp Lp1 which enters the steady state). In this way, the waveform of the lamp voltage Vlamp and the waveform of the lamp current Ilamp will be periodically fluctuating in positive half-cycles and negative half-cycles.

In prior art ballasts, a compensation circuit is required to substantially control the open-circuit voltage of the ballast within a predetermined range. Nonetheless, the circuit structure of the compensation circuit is quite complex and the efficiency of the ballast is reduced by using the compensation circuit. More disadvantageously, the cost of the ballast will increase due to the incorporation of the compensation circuit. The applicants propose a control device for controlling the open-circuit voltage of the ballast with a simplified circuit structure, thereby limiting open-circuit voltage of the ballast within a predetermined range.

SUMMARY OF THE INVENTION

The primary object of the invention is to provide a ballast for gas discharge lamps and having a control device with a simplified circuit structure for limiting the open-circuit of the ballast within a predetermined range.

According to a broad aspect of the invention, the invention provides a ballast for gas discharge lamps. The inventive ballast includes a power factor corrector receiving an AC input voltage and converting the AC input voltage into a DC voltage with a corrected power factor; a DC/DC converter connected to the power factor corrector and having a switch located at a low-voltage side of the DC/DC converter for converting the DC voltage with a corrected power factor into a DC output voltage according to switching operations of the switch; a controller connected to a control terminal of the switch in the DC/DC converter for sending a switching control signal to control the switching operations of the switch; and a control device for open-circuit voltage for detecting a voltage associated with an open-circuit voltage of the ballast and regulating a duty ratio or a pulse density or a switching frequency of the switching control signal according to results of detection, thereby controlling the open-circuit voltage of the ballast.

Now the foregoing and other features and advantages of the invention will be best understood through the following descriptions with reference to the accompanying drawings, wherein:

BRIEF DESCRIPTION OF THE DRAWINGS

FIG. 8 shows the waveform diagram of the lamp voltage and the lamp current of the ballast for gas discharge lamps.

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
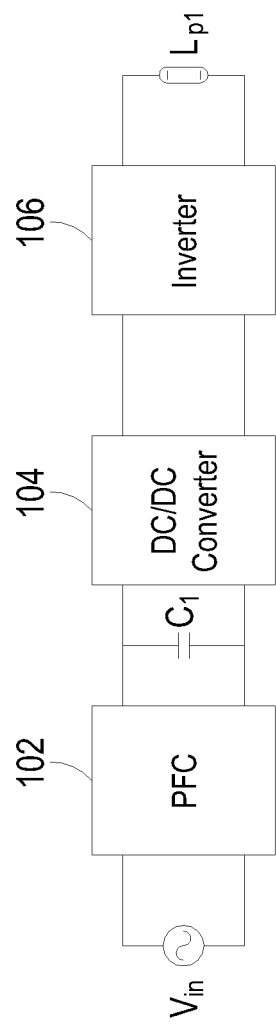
FIG. 1 shows a block diagram of a ballast for gas discharge lamps according to the prior art.
Figure 2:
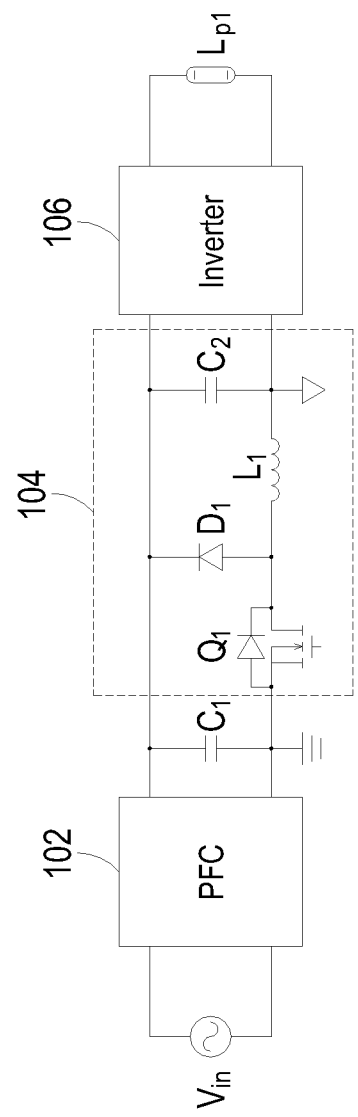
FIG. 2 shows a block diagram of a ballast for gas discharge lamps according to the prior art, in which the detailed circuitry of the DC/DC converter 104 of FIG. 1.
Figure 3:
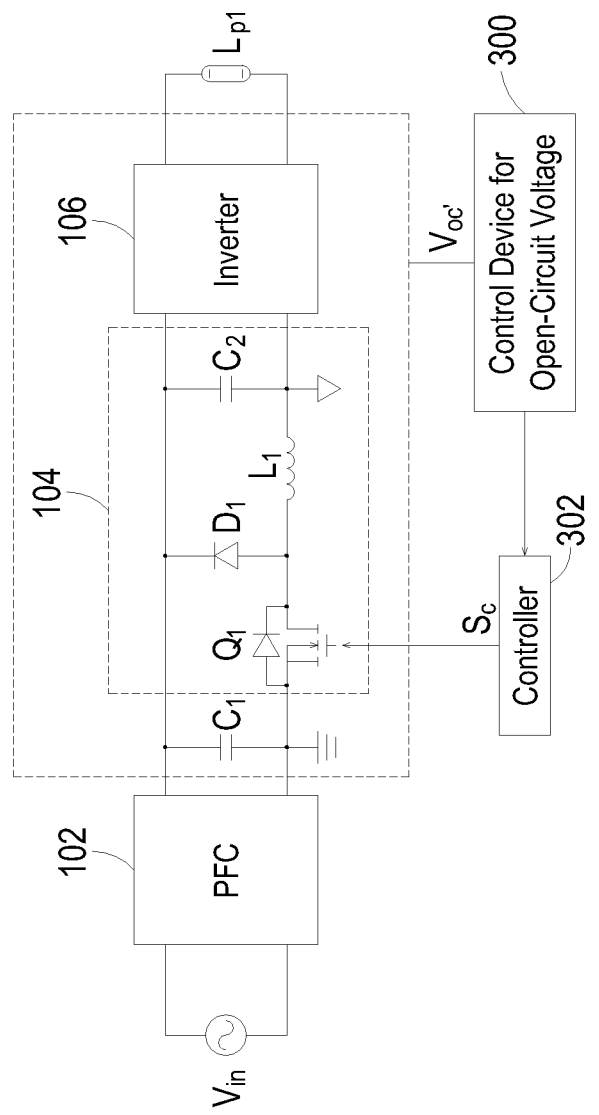
FIG. 3 shows a representative block diagram of the ballast and the control device for open-circuit voltage according to the invention.

FIG. 3 shows a representative block diagram of the ballast and the control device for open-circuit voltage according to the invention. Compared to the ballast for gas discharge lamps of FIG. 2, the ballast of FIG. 3 includes a control device for open-circuit voltage 300 which is connected to a controller 302 for the ballast. The controller 302 is connected to the control terminal of the switch Q1 and configured to generate a switching control signal Sc to control the switching operation of the switch Q1. The low-voltage side of the capacitor C1 is defined as a first reference potential, and the low-voltage side of the capacitor C2 is defined as a second reference potential. The control device for open-circuit voltage 300 is configured to detect a voltage Voc' associated with the open-circuit voltage of the ballast, such as the output voltage of the DC/DC converter 104 or the voltage difference between the output voltage of the PFC 102 and the output voltage of the DC/DC converter 104 (including the switch Q1, the rectifying diode D1, the inductor L1, and the capacitor C2). In response to the results of detection of the voltage Voc', a detecting signal is generated to control the duty ratio or pulse density or switching frequency of the switching control signal Sc. By sampling the voltage Voc' associated with the open-circuit voltage of the ballast, a detecting signal is generated and the duty ratio or pulse density or switching frequency of the switching control signal Sc which is used to control the switching operation of the switch Q1 is regulated accordingly. In this embodiment, if the lamp Lp1 is a DC lamp, the inverter 106 can be eliminated. In this embodiment, the open-circuit voltage of the ballast may be limited within the predetermined range. And when the DC/DC converter 104 is generating the open-circuit voltage, the DC/DC converter 104 may be controlled to operate in burst mode.

Figure 4:
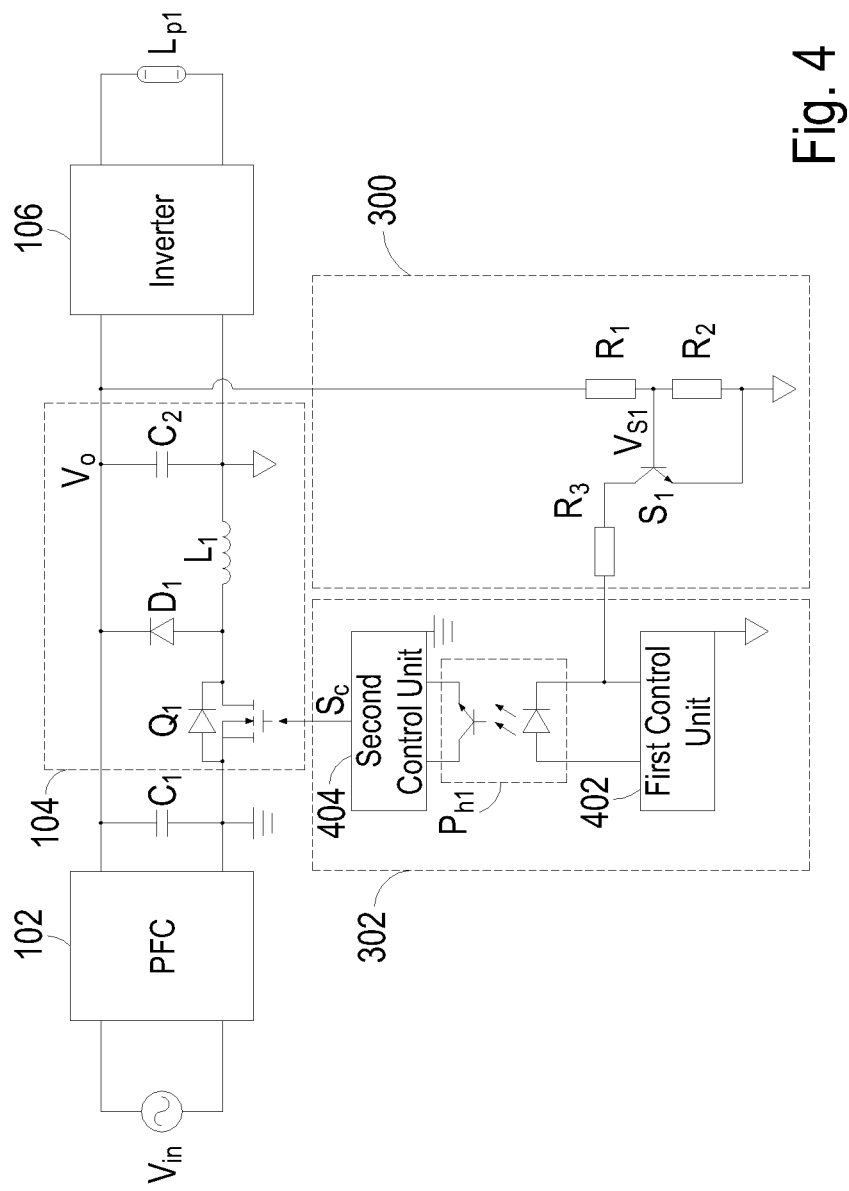
FIG. 4 shows a circuit block diagram of the ballast and the control device for open-circuit voltage according to a first exemplary embodiment of the invention.

FIG. 4 shows a circuit block diagram of the ballast and the control device for open-circuit voltage according to a first exemplary embodiment of the invention. As shown in FIG. 4, the control device 300 includes a detecting circuit consisted of a first resistor R1 and a second resistor R2. The control device 300 further includes a switch control device consisted of a control switch S1 and a third resistor R3. The controller 302 includes a first control unit 402, a second control unit 404, and an isolation device Ph1. In this embodiment, the voltage Voc' associated with the open-circuit voltage of the ballast is the output voltage Vo of the DC/DC converter 104 (i.e. the voltage on the capacitor C2). The first resistor R1 and the second resistor R2 are connected in series between the voltage output terminal of the DC/DC converter and a signal ground terminal to form a voltage divider for dividing the output voltage Vo of the DC/DC converter 104, thereby generating a first sampled voltage Vs1. The control switch S1 is made up of a bipolar junction transistor having a base connected to an intermediate node between the first resistor and the second resistor, an emitter connected to the signal ground terminal, and a collector connected to one end of the third resistor R3. The other end of the third resistor R3 is connected to an intermediate node between the isolation device Ph1 and the first control unit 402. The second control unit 404 is connected to the control terminal of the switch Q1. The first control unit 402 and the second control unit 404 are separated by the isolation device Ph1. In this embodiment, the isolation device Ph1 is made up of a photo coupler. As the ground potential of the first control unit 402 is the second reference potential and the ground potential of the second control unit 404 is the first reference potential, the isolation device Ph1 is essential as the ground potential of the first control unit 402 is different from the ground potential of the second control unit 404. The control terminal of the control switch S1 (base) receives the first sampled voltage Vs1 from the voltage divider consisted of the first resistor R1 and the second resistor R2, and is configured to turn on when the output voltage Vo is higher than a predetermined value, such as 300V. When the output voltage Vo is higher than the predetermined value so as to turn on the control switch S1, the collector voltage of the control switch S1 is low, and the isolation device Ph1 is turned on accordingly. Under this condition, the second control unit 404 will turn off and the switch Q1 is turned off accordingly. The first control unit 402 is configured to sample the lamp voltage and the lamp current of the gas discharge lamp Lp1, and send a power limiting signal (not shown) to the switch Q1 in response to the sampled lamp voltage and the sampled lamp current. Thus, the output power of the gas discharge lamp Lp1 is fixed at a constant value as the gas discharge lamp Lp1 enters the steady state. In this embodiment, the open-circuit voltage of the ballast can be controlled within a predetermined range. And when the DC/DC converter 104 is generating the open-circuit voltage, the DC/DC converter 104 may be controlled to operate in burst mode. Besides, the control switch S1 may be made up of a triode, a MOSFET, or an IGBT.

Figure 5:
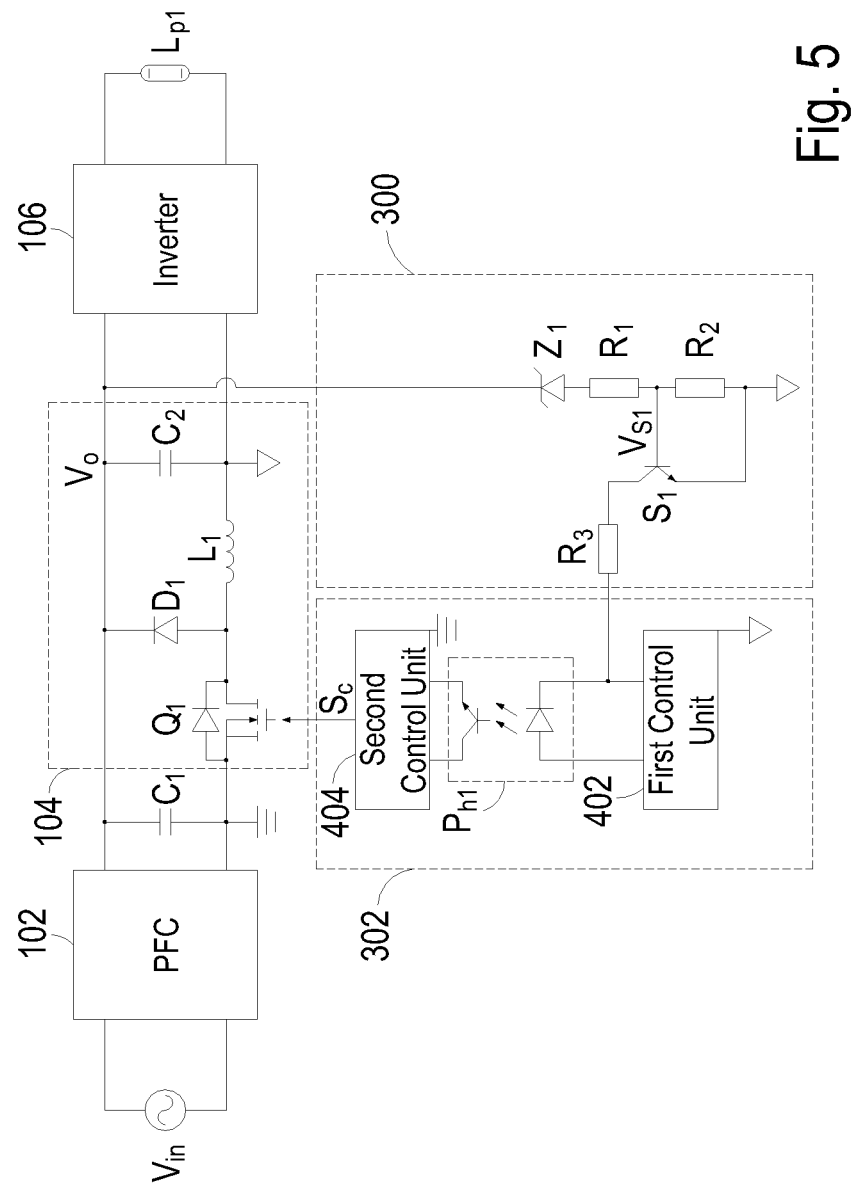
FIG. 5 shows a circuit block diagram of the ballast and the control device for open-circuit voltage according to a second exemplary embodiment of the invention.

FIG. 5 shows a circuit block diagram of the ballast and the control device for open-circuit voltage according to a second exemplary embodiment of the invention. In this embodiment, the voltage Voc' associated with the open-circuit voltage of the ballast is the output voltage Vo of the DC/DC converter 104 (i.e. the voltage on the capacitor C2). Compared to FIG. 4, the control device for open-circuit voltage 300 of FIG. 5 additionally includes a zener diode Z1 having an anode connected to the first resistor R1 and a cathode connected to the positive voltage output terminal of the DC/DC converter. The zener diode Z1 is used to overcome the tolerance of the base-emitter voltage (Vbe) of the control switch S1. Another advantage of the zener diode Z1 is that the zener diode Z1 is turned off to decrease the loss of the resistors R1 and R2 to zero when the gas discharge lamp Lp1 is operating normally. In this embodiment, the open-circuit voltage of the ballast may be limited within the predetermined range. And when the DC/DC converter 104 is generating the open-circuit voltage, the DC/DC converter 104 may be controlled to operate in burst mode.

Figure 6:
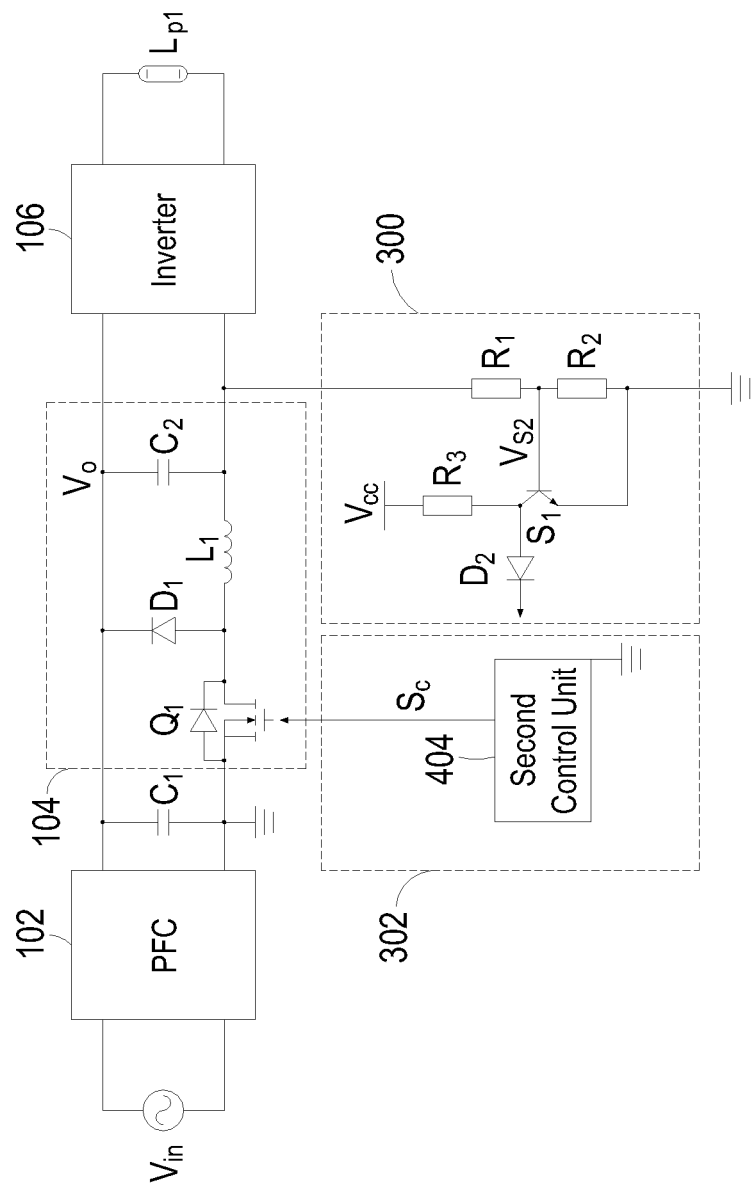
FIG. 6 shows a circuit block diagram of the ballast and the control device for open-circuit voltage according to a third exemplary embodiment of the invention.

FIG. 6 shows a circuit block diagram of the ballast and the control device for open-circuit voltage according to a third exemplary embodiment of the invention. In this embodiment, the voltage Voc' associated with the open-circuit voltage of the ballast is the voltage of the output voltage of the PFC 102 (i.e. the voltage on the capacitor C1) minus the output voltage Vo of the DC/DC converter 104 (i.e. the voltage on the capacitor C2). Compared to FIG. 4, the ground voltage of the control device for open-circuit voltage 300 is the second reference potential, and the open-circuit voltage of the electric ballast is detected indirectly. In FIG. 6, the third resistor R3 is connected to an auxiliary voltage Vcc, and the control device for open-circuit voltage 300 further includes a diode D2 connected between the collector of the control switch S1 and the second control unit 404. In this embodiment, the controller 302 may include the first control unit and the isolative phone coupler (not shown). Or otherwise, the control functions of the first control unit may be integrated into the second control unit. In this manner, the first control unit and the isolative photo coupler are unnecessary. The voltage divider consisted of the first resistor R1 and the second resistor R2 divides the voltage difference between the voltage on the capacitor C1 and the voltage on the capacitor C2 and thus generates a second sampled voltage Vs2. If the output voltage Vo (i.e. the voltage on the capacitor C2) is higher than a predetermined value, for example, 300V, the second sampled voltage Vs2 will not be sufficient to turn on the control switch S1. Therefore, the control switch S1 is turned off and the diode D2 is turned on. Under this condition, the second control unit 404 will alter the output signal Sc as a result of the conduction of the diode D2, thereby turning off the switch Q1. After the gas discharge lamp Lp1 is operating normally, the output voltage Vo (i.e. the voltage on the capacitor C2) will be lower than a predetermined value, for example, 300V. Under this condition, the second sampled voltage Vs2 will be sufficient to turn on the control switch S1. Thus, the diode D2 is turned off, and the second control unit 404 will not be controlled by the control device for open-circuit voltage 300 as a result of the OFF state of the diode D2, such that the second control unit 404 is able to generate the switching control signal Sc to control the switching operation of the switch Q1. It is noteworthy that the diode D2 is optional. In this embodiment, the open-circuit voltage of the ballast may be limited within the predetermined range. And when the DC/DC converter 104 is generating the open-circuit voltage, the DC/DC converter 104 may be controlled to operate in burst mode.

Figure 7:
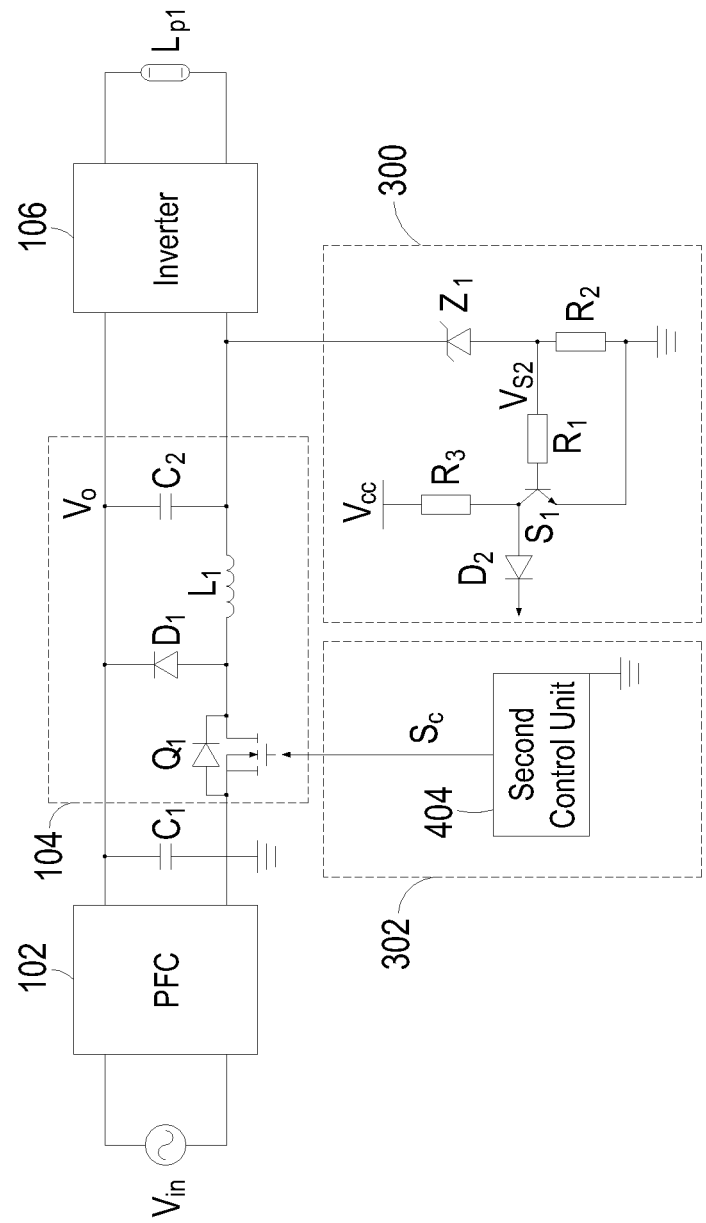
FIG. 7 shows a circuit block diagram of the ballast and the control device for open-circuit voltage according to a fourth exemplary embodiment of the invention.

FIG. 7 shows a circuit block diagram of the ballast and the control device for open-circuit voltage according to a fourth exemplary embodiment of the invention. In this embodiment, the voltage Voc' associated with the open-circuit voltage of the ballast is the voltage of the output voltage of the PFC 102 (i.e. the voltage on the capacitor C1) minus the output voltage Vo of the DC/DC converter 104 (i.e. the voltage on the capacitor C2). Compared to FIG. 6, the control device for open-circuit voltage 300 of FIG. 7 additionally includes a zener diode Z1 having an anode connected to the first resistor R1 and a cathode connected to the negative voltage output terminal of the DC/DC converter. The zener diode Z1 is used to overcome the tolerance of the base-emitter voltage (Vbe) of the control switch S1. In this embodiment, the open-circuit voltage of the ballast may be limited within the predetermined range. And when the DC/DC converter 104 is generating the open-circuit voltage, the DC/DC converter 104 may be controlled to operate in burst mode.

Another aspect of the invention is directed to a method for controlling the open-circuit voltage of a ballast for gas discharge lamps. The method disclosed herein includes the following steps. First of all, sampling a voltage in association with the open-circuit voltage of the ballast and generating a sampled voltage accordingly. Next, determining if the sampled voltage is higher than a predetermined value and in response to the results of the determination generating a detecting voltage. Finally, controlling the duty ratio or pulse density of switching frequency of the switching control signal used to control the switching operation of the ballast according to the detecting voltage, thereby limiting the open-circuit voltage of the ballast within a predetermined range.

In conclusion, the invention proposes a ballast for gas discharge lamps and a control device for the open-circuit voltage of the ballast. The inventive control device for the open-circuit voltage of the ballast includes a detecting circuit and a switching control device consisted of a control switch. The ballast includes a controller for outputting a switching control signal to control the switching operation of the DC/DC converter in the ballast. The detecting circuit is configured to sample a voltage associated with the open-circuit voltage of the ballast, and determining if the result of the sampling is higher than a predetermined voltage value, thereby generating a detecting signal. The switching control device will alter the switching control signal in response to the detecting signal, thereby limiting the open-circuit voltage of the ballast within a predetermined range. And when the DC/DC converter 104 is generating the open-circuit voltage, the DC/DC converter 104 may be controlled to operate in burst mode.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A ballast for gas discharge lamps, comprising:
a power factor corrector for receiving an AC input voltage and converting the AC input voltage into a DC voltage with a corrected power factor;
a DC/DC converter connected to the power factor corrector and having a switch located at a low-voltage side of the DC/DC converter for converting the DC voltage with a corrected power factor into a DC output voltage according to switching operations of the switch;
a controller connected to a control terminal of the switch in the DC/DC converter for sending a switching control signal to control the switching operations of the switch; and
a control device for open-circuit voltage including a detecting circuit for detecting a voltage associated with an open-circuit voltage of the ballast, and a switching control device connected to the detecting circuit for driving the controller to regulate a duty ratio or a pulse density or a switching frequency of the switching control signal according to results of detection by the detecting circuit for controlling the open-circuit voltage of the ballast;
wherein the switching control device includes:
a control switch having a pair of current-conducting terminals and a control terminal, wherein the control terminal is connected to the detecting circuit for receiving a sampled voltage; and
a third resistor connected to one of the current-conducting terminals of the control switch.

2. The ballast for gas discharge lamps according to claim 1 wherein the open-circuit voltage is limited within a predetermined range.

3. The ballast for gas discharge lamps according to claim 1 wherein when the DC/DC converter is generating the open-circuit voltage of the ballast, the control device for open-circuit voltage drives the switch of the DC/DC converter to operate in burst mode.

4. The ballast for gas discharge lamps according to claim 1 further comprising an inverter connected to the DC/DC converter and a gas discharge lamp for converting the DC output voltage into an AC voltage to drive the gas discharge lamp.

5. The ballast for gas discharge lamps according to claim 1 wherein the DC/DC converter is a buck converter.

6. The ballast for gas discharge lamps according to claim 1 wherein the detecting circuit is connected to the DC/DC converter for sampling the voltage associated with the open-circuit voltage of the ballast and thereby generating the sampled voltage, and wherein the switching control device is configured to determine if the sampled voltage is higher than the predetermined voltage value and in response thereto generating a detecting signal.

7. The ballast for gas discharge lamps according to claim 6 wherein the controller includes:
a first control unit configured to sample a lamp voltage and a lamp current of the gas discharge lamp and in response thereto sending a power limiting signal to the switch of the DC/DC converter to limit an output power of the ballast within a predetermined range;
a second control unit connected to the switching control device and the control terminal of the switch of the DC/DC converter for regulating the duty ratio or the pulse density or the switching frequency of the switching control signal according to the detecting signal for controlling the open-circuit voltage of the ballast; and
an isolation device connected between the first control unit and the second control unit for coupling the detecting signal to the second control unit.

8. The ballast for gas discharge lamps according to claim 7 wherein the isolation device is a photo coupler.

9. The ballast for gas discharge lamps according to claim 6 wherein the detecting circuit includes:
a first resistor connected to an output end of the DC/DC converter; and
a second resistor which forms a voltage divider with the first resistor for sampling the voltage associated with the open-circuit voltage of the ballast and thereby generating the sampled voltage.

10. The ballast for gas discharge lamps according to claim 9 wherein the control terminal of the control switch is connected to an intermediate terminal between the first resistor and the second resistor for receiving the sampled voltage and configured to turn on or off the control switch according to the determination of whether the sampled voltage is higher than the predetermined voltage value for generating the detecting signal.

11. The ballast for gas discharge lamps according to claim 9 wherein the detecting circuit further includes a zener diode connected between an output end of the DC/DC converter and the first resistor for overcoming a tolerance of the voltage difference between the current-conducting terminals of the control switch.

12. The ballast for gas discharge lamps according to claim 6 wherein the switching control device further includes:
a diode connected between a current-conducting terminal of the control switch and the second control unit.

13. The ballast for gas discharge lamps according to claim 1 wherein the control switch is a bipolar junction transistor, a metal-oxide-semiconductor field-effect transistor, or an insulated-gate bipolar transistor.

14. The ballast for gas discharge lamps according to claim 1 wherein the voltage associated with the open-circuit voltage of the ballast is an output voltage of the DC/DC converter or a voltage difference between an output voltage of the power factor corrector and the output voltage of the DC/DC converter.

15. A method for controlling an open-circuit voltage of a ballast for gas discharge lamps, which comprises a switching control device having a control switch and a resistor, wherein the control switch has a pair of current-conducting terminals, one of which is connected to the resistor and a control terminal of the control switch, the method comprising the steps of:
sampling a voltage in association with the open-circuit voltage of the ballast and thereby generating a sampled voltage;
receiving the sampled voltage by the control terminal of the control switch;
determining if the sampled voltage is higher than a predetermined voltage value, turning on or off the control switch according to a determined result for generating a detecting signal; and
regulating a duty ratio or a pulse density or a switching frequency of a switching control signal used to control switching operations of the ballast according to the detecting signal for limiting the open-circuit voltage of the ballast within a predetermined range.

16. The method for controlling an open-circuit voltage of a ballast for gas discharge lamps according to claim 15 wherein the ballast includes a DC/DC converter and the method further includes the step of:

when the DC/DC converter is generating the open-circuit voltage of the ballast, driving the DC/DC converter to operate in burst mode.

\* \* \* \* \*